United States Patent

Glassey et al.

[11] Patent Number: 6,016,653
[45] Date of Patent: Jan. 25, 2000

[54] AFTER-INJECTION COMBUSTION EXHAUST PURIFICATION SYSTEM AND METHOD

[75] Inventors: Stephen F. Glassey, East Peoria; William H. Lane, Chillicothe; Daniel J. Learned, Peoria; Randy N. Peterson, Peoria; Aaron L. Smith, Peoria, all of Ill.

[73] Assignee: Caterpillar Inc., Peoria, Ill.

[21] Appl. No.: 08/908,028

[22] Filed: Aug. 14, 1997

Related U.S. Application Data

[63] Continuation of application No. 08/483,605, Jun. 7, 1995, abandoned.

[51] Int. Cl.$^7$ .................................................. F01N 3/00
[52] U.S. Cl. ........................... 60/274; 60/285; 60/286; 60/301
[58] Field of Search ................ 60/274, 285, 301, 60/286, 303; 422/170

[56] References Cited

U.S. PATENT DOCUMENTS 5,207,058 5/1993 Sasaki et al. ............................ 60/284
5,319,558 6/1994 Nemoto et al. ..................... 364/431.05
5,601,792 2/1997 Hug et al. ............................... 422/170

*Primary Examiner*—Thomas E. Denion
*Attorney, Agent, or Firm*—Robert J. Hampsch

[57] ABSTRACT

The present invention is particularly well suited for purifying exhaust from relatively large lean burn diesel engines. The emissions purification system causes an after-injection of fuel through the engine fuel injector during the exhaust stroke of an internal combustion engine. A computer controls the injector to inject an optimal amount of NOx reducing fuel into the engine cylinder. The optimal amount corresponds to an amount that will achieve optimal NOx reduction rates for the given engine operating condition and exhaust temperature. A computer periodically senses the engine operating condition and determines the exhaust temperature, and calculates the appropriate injection amount. With appropriate deNOx and oxidation catalysts located downstream from the injector, the emissions purification system of the present invention has the ability to greatly reduce NOx content of the exhaust while maintaining HC emissions at acceptable levels and greatly reducing system complexity.

9 Claims, 2 Drawing Sheets

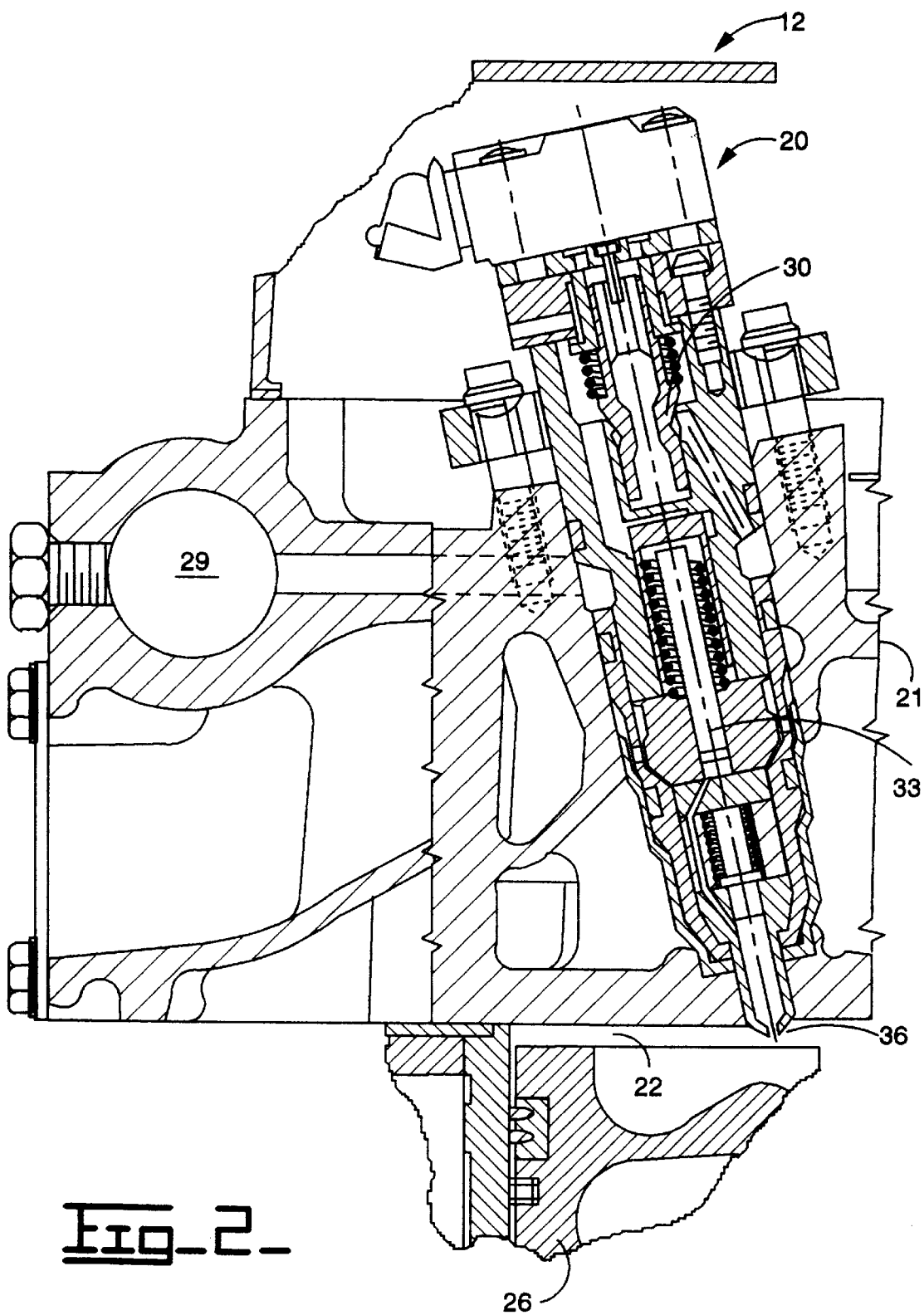
Fig_2

6,016,653

AFTER-INJECTION COMBUSTION EXHAUST PURIFICATION SYSTEM AND METHOD

This is a file wrapper continuation of application Ser. No. 08,483,605, filed Jun. 7, 1995, now abandoned.

TECHNICAL FIELD

The present invention relates generally to purification of combustion exhaust and specifically to the treating of an exhaust gas stream of an engine for the removal of NOx from the gas stream.

BACKGROUND ART

Due to primarily federal regulations, engine manufacturers are being forced to reduce the amount of harmful compounds in the combustion exhaust. To effectively reduce the NOx concentrations in the exhaust stream of lean burning engines—including diesel and certain spark ignited engines—the present technology of NOx catalysts requires a sufficient concentration of hydrocarbon (HC) species to be present. In other words, in combustion exhaust purification systems having an oxygen environment above 3% concentration, some type of reducing agent, usually a hydrocarbon compound, must be introduced into the exhaust in order to achieve acceptable reduction levels of NOx compounds. Different means of adding the HC into the exhaust stream have been developed including the addition of HC injectors to continuously or periodically inject HC into the exhaust stream. Unfortunately, these methods of introduction of HC into the exhaust increase system complexity and cost and do not allow for optimum atomization and vaporization of the HC.

What is needed is an exhaust gas purification system that is easily controlled, performs effectively across a complete operating range of the engine, and achieves satisfactory reduction of NOx compounds in the exhaust while reducing the overall system complexity and eliminating the need for additional HC injectors.

DISCLOSURE OF THE INVENTION

In one aspect of the present invention an emissions purification system for an internal combustion engine is disclosed. The purification system includes a fuel injector disposed within the cylinder of an internal combustion engine and means for injecting fuel into the cylinder during the exhaust stroke of said engine.

In another aspect of the present invention an emissions purification system has an injector disposed within the cylinder of an internal combustion engine. The injector is capable of first injecting fuel into the cylinder during the compression stroke of the engine, and second injecting fuel into the cylinder during the exhaust stroke of the engine.

In another aspect of the present invention a method of reducing internal combustion engine emissions is disclosed. The method includes the steps of positioning an injector in a cylinder of an internal combustion engine. Then injecting fuel into the cylinder of the internal combustion engine during the exhaust stroke of the engine.

One object of the present invention is to provide an emissions purification system which eliminates the additional HC injection system including the injectors and supporting equipment.

Another object of the present invention is to improve the system efficiency by increasing the frequency of HC injections and providing a system which improves the injection atomization and vaporization.

BRIEF DESCRIPTION OF THE DRAWINGS

FIG. 2 is a cross-sectional view of a hydraulically-actuated electronically controlled unit fuel injector installed in a exemplary internal combustion engine.

BEST MODE FOR CARRYING OUT THE INVENTION

Figure 1:
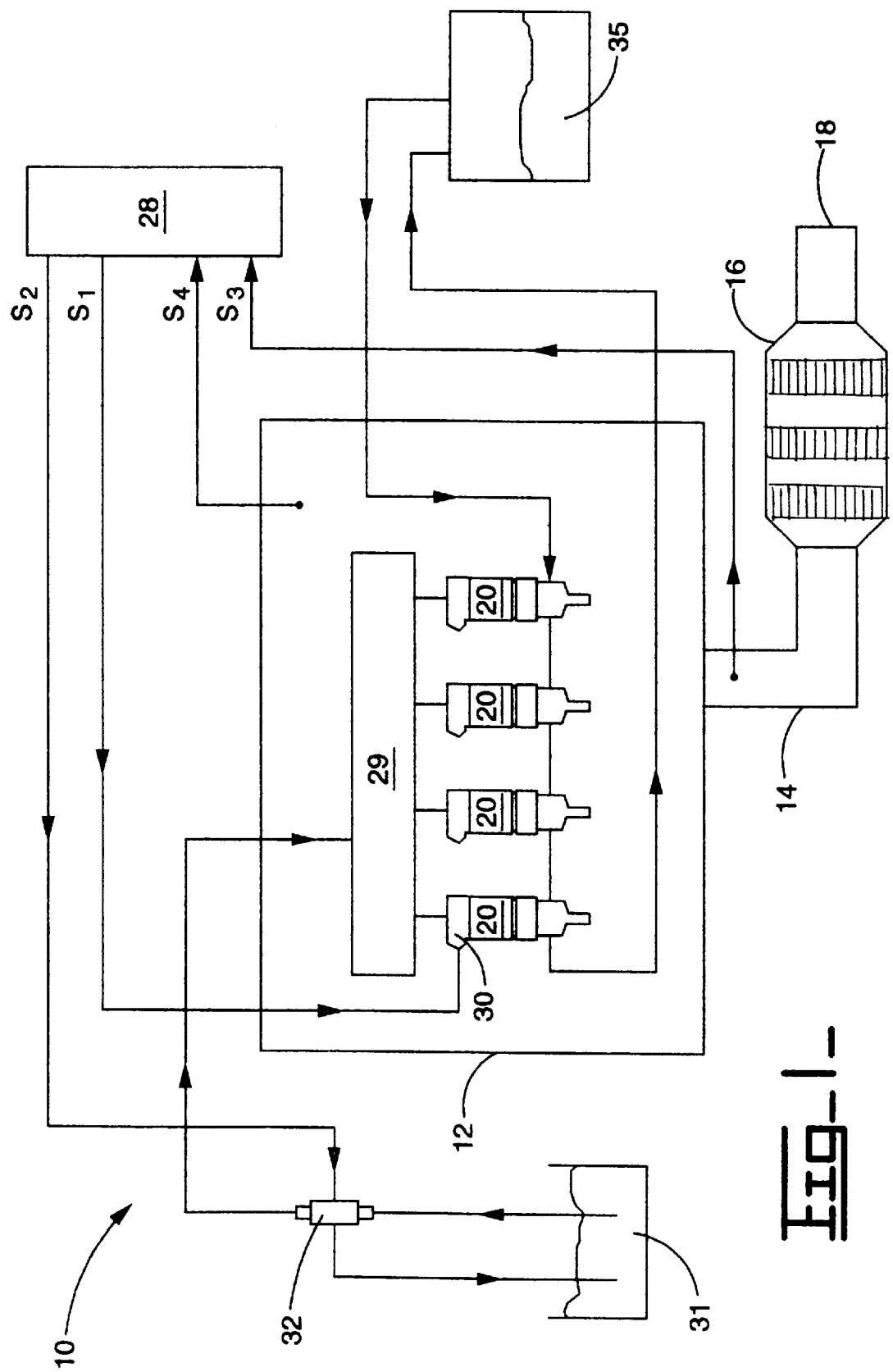
FIG. 1 is a schematic illustration of a combustion exhaust purification system according to the preferred embodiment of the present invention.

Referring now to FIG. 1, an exhaust gas purification system 10 according to the preferred embodiment of the present invention is shown in use with an internal combustion engine 12. At present, the invention finds its best application in relation to lean burn diesel engines, such as Caterpillar 3500 series diesel engines however, the present invention is applicable to all internal combustion engines including 4-cycle and 2-cycle designs. Exhaust exits engine 12 via exhaust passageway 14 on its way to catalytic converter 16 and eventually exits at outlet 18. Catalytic converter 16 includes a deNOx catalyst, such as zeolite ZSM5 or a precious metal based catalyst, or a combination of both. In many applications it may also be desirable to include an oxidation catalyst of a type known in the art downstream from the deNOx catalyst. In the preferred embodiment for a lean burn diesel engine, the inclusion of a third catalyst between the deNOx and oxidation catalyst may effectively increase reduction of undesirable nitrogen compounds present after the exhaust passes through the deNOx catalyst.

Additional HC is injected into the system by way of a small after-injection of fuel through the fuel injector 20 which is mounted to the engine cylinder head 21 and positioned to inject fuel into the engine cylinder 22. The after-injection is timed after the main injection and results in additional HC, in the form of engine operating fuel, being injected into the engine cylinder substantially during the exhaust stroke of the engine. The exhaust stroke being that portion of the engine operation when the exhaust valve 24 (not shown) is open and the piston 26 acts to push combustion exhaust from the engine cylinder 22. Injecting the additional HC in this manner results in better atomization and vaporization of the fuel than is obtained by using a conventional HC injector and results in higher overall system efficiency. Although the after-injection occurs substantially during the exhaust stroke, the initiation of the after-injection may occur during the end of the expansion stroke due to the need to advance or retard the timing of the injection to maximize the system performance. This is similar to the need to slightly advance or retard the main fuel injection. By slightly retarding the timing, the fuel injection, although occurring substantially during the compression stroke, actually initiated during the expansion stroke.

The injector 20 must be of a design to introduce the required amount of fuel, with an injection shape to minimize emissions, substantially during the compression stroke and then to inject the optimal amount of fuel substantially during the engine exhaust stroke. The injector 20 is preferably an electronically controlled unit injector or a hydraulically-actuated electronically controlled unit injector; however, a mechanically-actuated injector or a pump and lines fuel system which has the capability of injecting the optimal quantity of fuel at a selectable time and pressure would provide for proper operation of the present invention. The optimal amount is dependent upon the exhaust temperature and the operating condition of engine 12. The term optimal amount means that amount which will produce the greatest overall NOx reduction for a given exhaust temperature and operating condition without unnecessarily increasing the amount of HC being injected. In the preferred embodiment, this is accomplished by utilizing a computer 28 that has the ability to control the state of the injector 20. In the case of a mechanically-actuated injector, the cam (not shown) of the internal combustion engine would be modified to include an extra lobe which would provide for the pressurization and injection of the additional fuel following the main injection.

The injector 20 has open and closed operating states. The open operating state allows fuel to exit the injector and enter the combustion chamber. The injector closed operating state blocks fuel from exiting the fuel injector. In the preferred embodiment, the state of the injector 20 is controlled by an actuating valve 30 which is disposed within the injector 20. Communication with the actuating valve $S_1$ allows for external control of the time the injector is in the open and closed states.

In FIG. 2 a hydraulically-actuated electronically controlled unit injector installed in an engine is shown. The actuating valve 30 is of a poppet-type valve which controls the fluid communication of high pressure actuating fluid to the injector. The actuating fluid supply 31 includes a pressure control valve 32 which regulates the pressure of the actuating fluid being delivered the common rail 29 which supplies actuating fluid to each injector. In this embodiment, control of the poppet valve 30 allows for external control of the timing and quantity of fuel injected by controlling the movement of the pressurization member 33 disposed within the injector 20.

Alternatively an electronically controlled unit injector could be used. In this type of injector the actuating valve 30 directly controls the fluid communication between the low pressure fuel supply 35 and the high pressure storage volume 34 (not shown) within the injector and also controls the fluid communication between the fuel storage volume 34 and the fuel injection orifices 36 in the injector 20.

In the preferred embodiment, multiple fuel injections occur while maintaining a relatively constant injection pressure. This provides the benefit being able to hold the mass flow rate of the fuel injection relatively constant over multiple injections and over the time period when the injector is in its open operating state and to be able to provide an after-injection of the optimal quantity and at a selected time which is independent of the previous injection cycles.

Computer 28 periodically determines the engine load and operating condition via a plurality of engine sensors. The sensor outputs are transferred to the computer 28 via exemplary signals $S_3$ and $S_4$. Preferably the computer 28 resides within the engine electronic control unit. In motor vehicle applications, it may be desirable for computer 28 to periodically determine the operating condition of the complete vehicle, such as engine rpm, transmission gear and vehicle speed. These additional sensors would be desirable in those cases where exhaust gas purification was shown to be sensitive to the vehicle's operating conditions as well as the particular engine's operating conditions.

Although it is known that the NOx content of the exhaust is a strong function of an engines operating condition, the relationship of these two variables varies between engine configurations and can be very unpredictable. Furthermore, the chemical reactions resulting in NOx reduction are sensitive to exhaust temperature, but this relationship is also non-linear and not satisfactorily predictable with today's modeling tools. As a result, in the preferred embodiment of the present invention, empirical data for a given engine configuration is acquired for subsequent storage in a memory location within computer 28. In other words, an optimal after-injection amount can be determined empirically for a given system at a plurality of engine operating conditions and loads. Thus, with relatively simple software, computer 28 can periodically adjust the after-injection quantity and timing from the fuel injector 20 to correspond to an optimal injection amount and timing based upon the engine operating condition and engine exhaust temperature. The software also may include the capability to monitor whether an injector has malfunctioned. If an injector malfunctions, the appropriate internal computer flags and external indicators are activated in order to alert an attendant that maintenance is needed.

In the preferred embodiment, the empirical data is converted into injector on-time increments corresponding for each injector cycle. In this way, the computer simply senses the engine's operating condition, determines the exhaust temperature, and determines an optimal injector open time from the table stored in computer memory. The computer 28 then commands the fuel injector 20 to open at the correct timing following main injection and commands the fuel injector to close when the optimal quantity of fuel has been injected.

In some applications it may be desirable to convert the empirical data into curve fit equations that are utilized by the computer as an alternative to a "look-up" table, as previously described. In such a case, the injector on-time would be calculated via the curve fit function utilizing the sensed engine operating conditions. In the case of the mechanical unit injector, the timing and quantity of fuel injected is determined by the lobe on the cam shaft.

In HC injection systems known in the art, the frequency of the injector is selected as a trade-off between optimal conversion efficiency and injector life. Higher injection frequency improves conversion efficiency, but the increased number of injector cycles results in shorter injector life. Because the engines fuel injectors have been designed for high cycle life, the present invention has the added advantage of being able to inject HC after each firing of the cylinder, thereby maximizing the conversion frequency of the deNOx catalyst. Also, the after-injection may be performed by any number of the engine fuel injectors. The computer 28 can deliver a signal to one or all of the injectors 20 to perform an after-injection thereby greatly minimize any affect on fuel injector life.

The present invention also has the advantage of injecting into the cylinder where the exhaust temperature and pressure are higher allowing for better vaporization which increase system efficiency. The use of the fuel injector also allows for injection at a higher pressure than conventional HC injection systems which provides better atomization of the additional HC.

It should be understood that only the preferred embodiments have been shown and described, and that many other different embodiments come within the contemplated scope of the present invention. For example, only two types of fuel injectors have been described; however, any design fuel injector capable of injecting fuel once during the compression stroke and a second time during the exhaust stroke will allow for proper operation of the present invention. Also, the preferred embodiment discloses a 4-cycle internal combustion engine; however, the present invention is equally applicable to a 2-cycle engine with the use of an injector capable of an after-injection during the exhaust stroke. In any event, the above embodiments are merely examples of the present invention, and the full legal scope of the invention is defined solely with respect to the claims set forth below.

INDUSTRIAL APPLICABILITY

By injecting the additional HC directly into the combustion chamber by way of the fuel injector 30, the efficiency of undesirable contaminant removal by the catalyst is markedly increased. This increase in efficiency and effectiveness is generated by the increased frequency at which HC can be injected which results in optimal conversion. Also the injection of the HC into the higher temperature and pressure of the engine cylinder results in better vaporization of the HC improving system efficiency. The use of the fuel injector to inject the additional HC results in the elimination of a separate HC injectors and the supporting equipment as are found in most DeNOx conversion systems. This greatly improves/reduces system complexity and reliability since typically the injector is located in a hot, hostile environment, and requires the use of a liquid cooling system or the introduction of air and mixing of the air with the NOx reducing agent to provide sufficient cooling to assist in avoiding equipment damage. Injecting the additional HC by way of the fuel injector also increases injection pressure which improves atomization of the HC and improve system performance. Other aspects, objects and advantages of this invention can be obtained from a study of the drawings, the disclosure and the appended claims.

We claim:

1. An emissions purification system comprising:
   a fuel injector disposed within the cylinder of an engine, said injector being capable of a first main injection, and a second after-injection of a hydrocarbon compound reducing agent for use in downstream catalytic reactions;
   wherein said main injection occurs substantially during the compression stroke, and said after-injection being initiated during said expansion stroke and continuing during the exhaust stroke; and
   a catalytic converter apparatus including a deNox catalyst, an oxidation catalyst, and a third catalyst that promotes elimination of undesirable nitrogen containing compounds present in the exhaust downstream of said deNox catalyst, said catalytic converter being positioned downstream of said engine.

2. The emissions purification system of claim 1 wherein said injector is an electronically controlled unit injector.

3. The emissions purification system of claim 1 wherein said injector is a hydraulically-actuated electronically controlled unit injector.

4. A method of reducing engine emissions from an internal combustion engine having an injector in a cylinder of said internal combustion engine and an exhaust system, said method comprising the steps of:
   predetermining optimal amounts for the injection of fuel during the exhaust stroke over a portion of the operating range of said engine and over a range of exhaust temperatures;
   determining the temperature of the exhaust and operating condition of said engine;
   ascertaining a secondary fuel quantity based upon said predetermined optimal amounts, said measured temperature of the exhaust, and said determined operating condition of said engine;
   injecting said secondary fuel quantity into said cylinder during an exhaust stroke of said engine for use in downstream catalytic reactions;
   directing the exhaust containing said secondary fuel quantity through a first substrate coated with a deNOx catalyst disposed in said exhaust system;
   directing the exhaust exiting said first substrate through another substrate disposed downstream of said first substrate and coated with a catalyst that promotes elimination of undesirable nitrogen containing compounds present in the exhaust; and
   directing the exhaust exiting said other substrates through a substrate coated with an oxidation catalyst, said oxidation catalyst coated substrate disposed downstream of said other substrates.

5. The emission reducing method of claim 4 further including the step of predetermining the optimal amounts empirically for a given combustion source.

6. The method of claim 4 further comprising the step of storing the predetermined optimal amounts in a memory location accessible to a processor that performs said computing step.

7. The method of claim 6 wherein said computing step includes the steps of:
   accessing said memory location and choosing which optimal amount corresponds most closely to the measured temperature of the exhaust and the determined operating condition of the combustion source; and
   controlling the operating state of the injector during said injecting step to deliver the chosen optimal amount of fuel into the cylinder during the next exhaust stroke.

8. The method of claim 7 wherein the injector has only two operating states, an open operating state in which the fuel is injected and a closed operating state in which fuel injection is blocked, said computing step further includes the step of calculating the amount of time that the injector should be in said open operating state during the next exhaust stroke to deliver the chosen optimal amount of the fuel.

9. An emissions purification system comprising:
   a fuel injector disposed within the cylinder of an engine, said infector being capable of a first main injection, and a second after-injection of a hydrocarbon compound reducing agent for use in downstream catalytic reactions;
   wherein said main injection occurs substantially during the compression stroke, and said after-injection being initiated during said expansion stroke and continuing during the exhaust stroke;
   a catalytic converter apparatus including a deNox catalyst, an oxidation catalyst, and a third catalyst that promotes elimination of undesirable nitrogen containing compounds present in the exhaust downstream of said deNox catalyst, said catalytic converter being positioned downstream of said engine; and
   an engine controller including predetermined optimal values corresponding to fuel amounts for said after-injection over a portion of the operating range of said engine and over a range of exhaust temperatures, said engine controller adapted to determine the temperature of the exhaust and operating condition of said engine and ascertaining an after-injection fuel quantity based upon said predetermined optimal amounts, said temperature of the exhaust, and said determined operating condition of said engine.

* * * * *